(12) United States Patent
Chih

(10) Patent No.: US 7,370,337 B2
(45) Date of Patent: May 6, 2008

(54) INTERNAL/EXTERNAL ENCLOSURE FOR COMPUTER REMOVABLE STORAGE MEDIUM

(76) Inventor: Yung-Chao Chih, No.443, Huannan Rd., Pingihen City, Taoyuan County (TW) 324

( * ) Notice: Subject to any disclaimer, the term of this patent is extended or adjusted under 35 U.S.C. 154(b) by 599 days.

(21) Appl. No.: 11/051,211

(22) Filed: Feb. 7, 2005

(65) Prior Publication Data

US 2006/0179442 A1   Aug. 10, 2006

(51) Int. Cl.
*G11B 17/03* (2006.01)
(52) U.S. Cl. ....................................... 720/600
(58) Field of Classification Search ............ None
See application file for complete search history.

(56) References Cited

U.S. PATENT DOCUMENTS

| | | | | |
|---|---|---|---|---|
| 6,545,839 B2 * | 4/2003 | Smith | ............... | 360/97.01 |
| 6,804,821 B1 * | 10/2004 | Reed | ............... | 720/622 |
| 6,894,865 B2 * | 5/2005 | Chang et al. | ............... | 360/97.01 |
| 7,149,080 B2 * | 12/2006 | Jackson, Jr. | ............... | 361/683 |
| 7,295,429 B2 * | 11/2007 | Jackson, Jr. | ............... | 361/681 |
| 2007/0070590 A1 * | 3/2007 | Littlepage | ............... | 361/683 |

* cited by examiner

*Primary Examiner*—Allen Cao
(74) *Attorney, Agent, or Firm*—Morris Manning Martin LLP; Tim Tingkang Xia, Esq.

(57) ABSTRACT

An internal/external enclosure for computer removable storage medium includes a main body being provided on front and rear sides near at least one lateral end thereof with a slot each, and more than one supporting device separately operatively mounted in the slots. The supporting devices are movable between an extended position, in which the whole internal/external enclosure is stably and uprightly supported on a desired place for use, and a folded position, in which the whole internal/external enclosure could be conveniently carried about.

5 Claims, 9 Drawing Sheets

INTERNAL/EXTERNAL ENCLOSURE FOR COMPUTER REMOVABLE STORAGE MEDIUM

FIELD OF THE INVENTION

The present invention relates to an internal/external enclosure for computer removable storage medium, and more particularly to an internal/external enclosure for computer removable storage medium that could be stably supported on a desired place for use, and conveniently carried about when it is not in use.

BACKGROUND OF THE INVENTION

FIG. 1 shows a conventional internal/external enclosure for computer removable storage medium that includes a main body 3 having a memory unit provided therein, and a seat 4 engaged with a bottom of the main body 3 to keep the main body 3 in an upright position on a desired place for use.

The seat 4 must be separated from the main body 3 when the internal/external enclosure is not in use and it is desired to carry the internal/external enclosure to some other place. The seat 4 separated from the main body 3 tends to cause inconvenience in carrying the internal/external enclosure about, and is easily getting lost or fallen. Moreover, since the main body 3 is supported on the seat 4 without any fastening means provided between them to ensure firm connection of the seat 4 to the main body 3, the main body 3 tends to separate from or fall down the seat 4, and the separated seat 4 is easily getting lost. Therefore, the conventional internal/external enclosure for computer removable storage medium shown in FIG. 1 does not satisfy the users.

SUMMARY OF THE INVENTION

A primary object of the present invention is to provide an internal/external enclosure for computer removable storage medium that could be stably supported on a desired place for use, and conveniently carried about when it is not in use.

To achieve the above and other objects, the internal/external enclosure for computer removable storage medium according to the present invention includes a main body being provided on front and rear sides near at least one end thereof with a slot each, and more than one supporting device separately operatively mounted in the slots. The supporting devices are movable between an extended position, in which the whole internal/external enclosure is stably supported on a desired place for use, and a folded position, in which the whole internal/external enclosure could be conveniently carried about.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
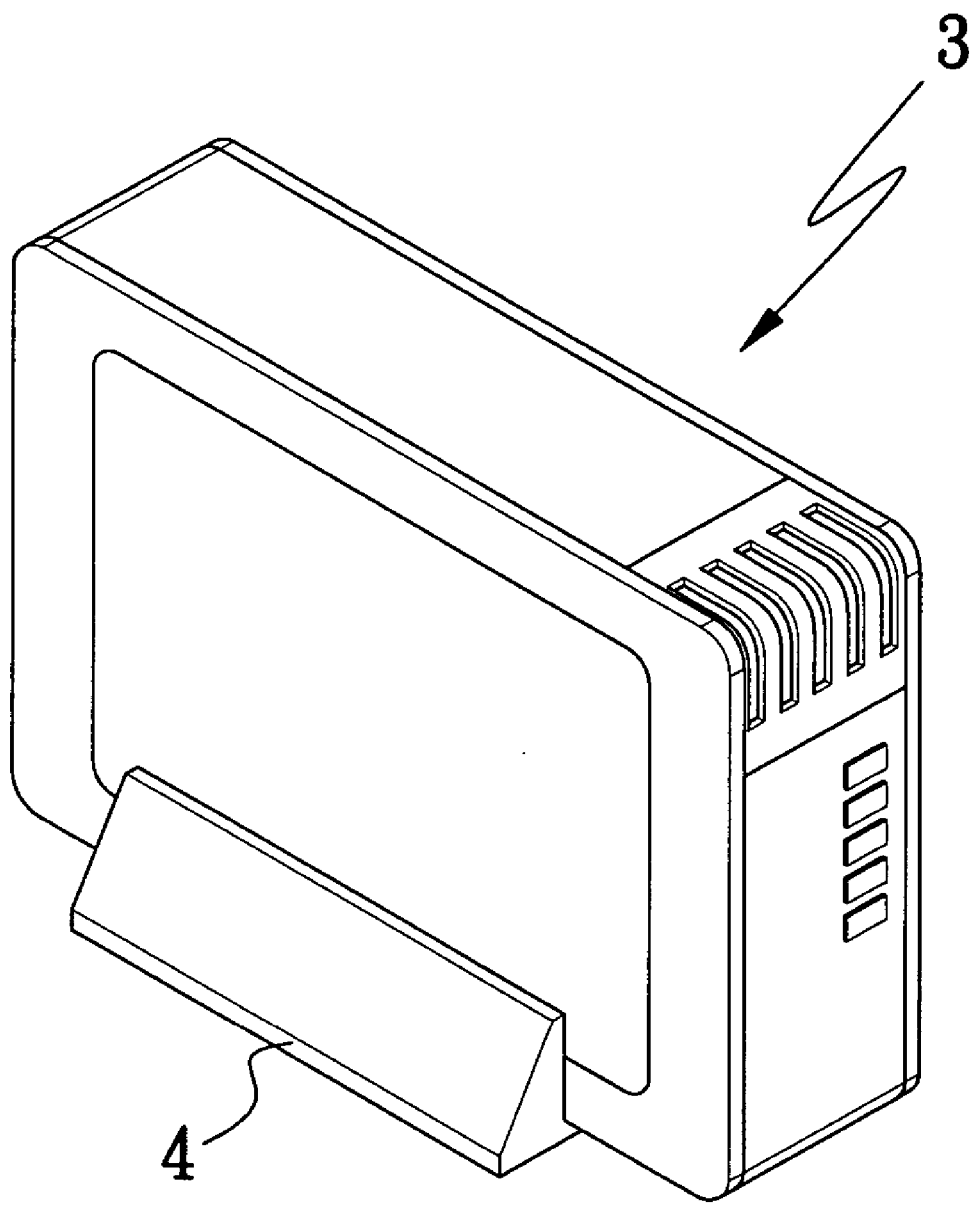
FIG. 1 is a perspective view of a conventional internal/external enclosure for computer removable storage medium.
Figure 2:
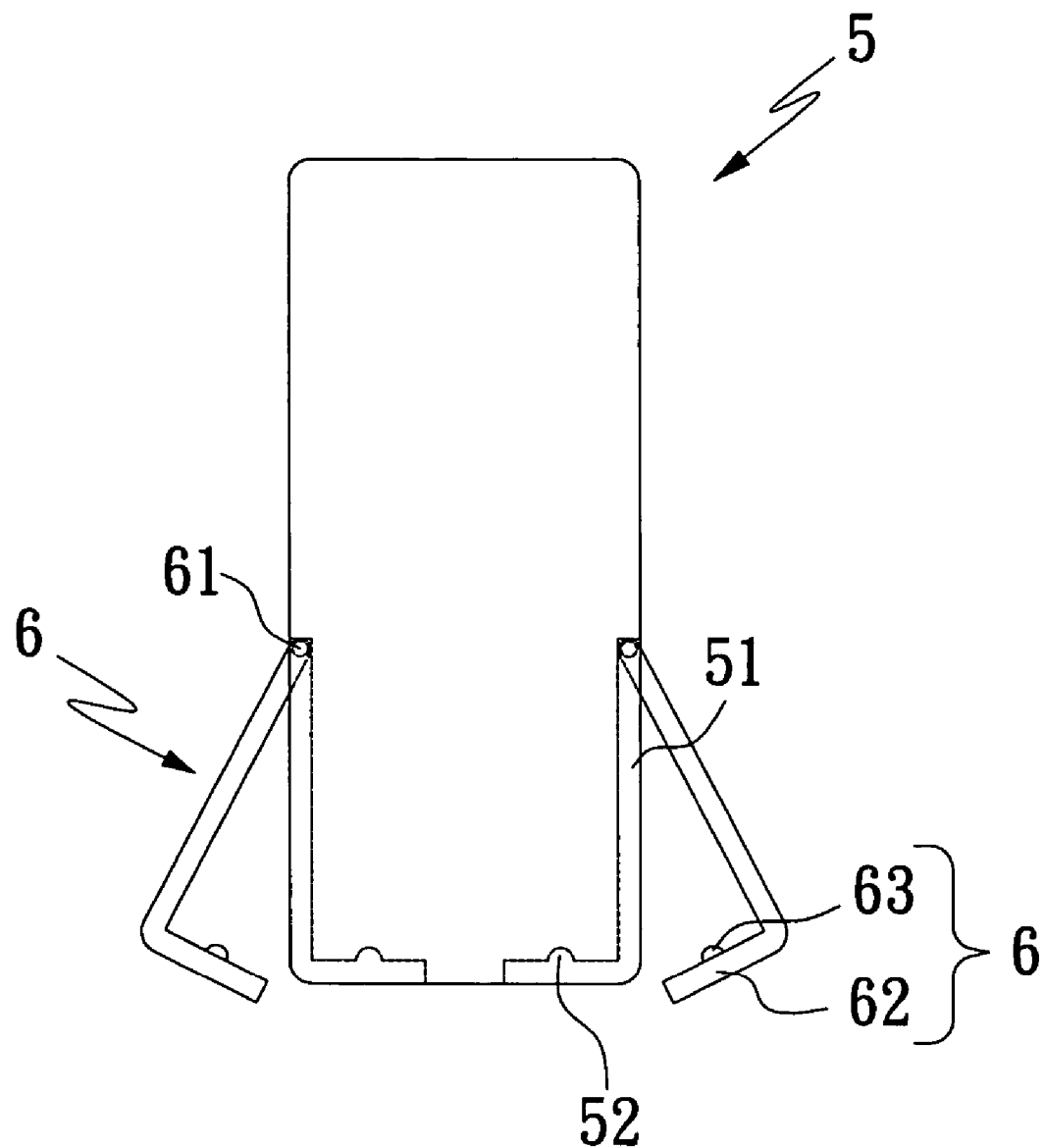
FIG. 2 is a sectioned side view of an internal/external enclosure for computer removable storage medium according to a first embodiment of the present invention.
Figure 3:
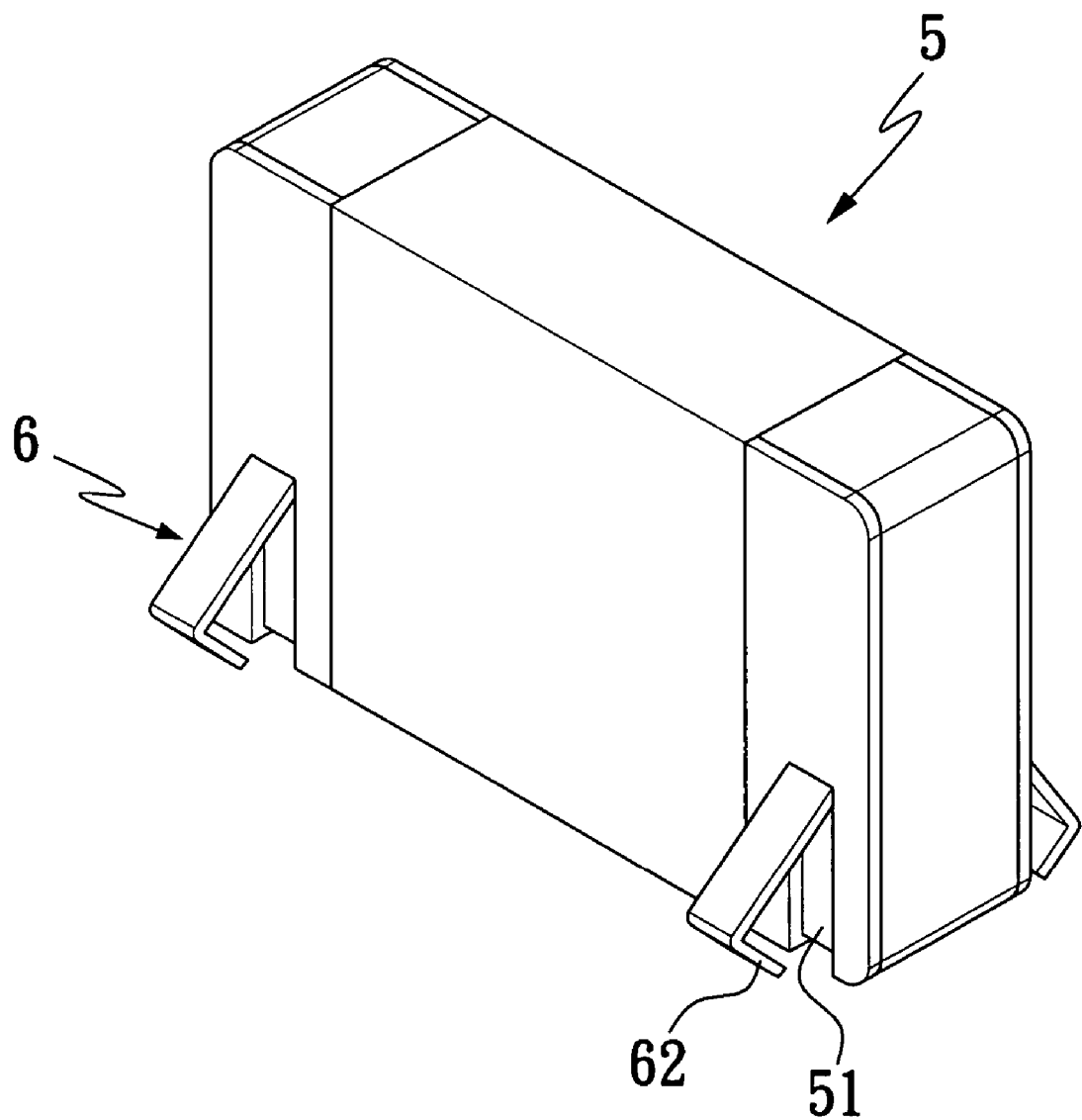
FIG. 3 is an assembled perspective view of the internal/external enclosure of FIG. 2.

Please refer to FIGS. 2 and 3 that are sectioned side view and assembled perspective view, respectively, of an internal/external enclosure for computer removable storage medium according to a first embodiment of the present invention. For the purpose of concision, the present invention is also briefly referred to as the internal/external enclosure throughout the specification. As shown, the internal/external enclosure according to the first embodiment of the present invention mainly includes a main body 5 and more than one supporting device 6, so that the whole internal/external enclosure is easily portable and could be stably positioned at a desired place for use.

The main body 5 is provided at front and rear sides near at least one lateral end thereof with a downward extended slot 51 each. The slot 51 downward extends from the front/rear side to a bottom of the main body 5 and is provided at a bottom section with a retaining means 52.

The supporting devices 6 are separately operatively mounted in the slots 51. Each of the supporting devices 6 is provided at two lateral sides of an upper end with a shaft 61 each for rotatably connecting to two sidewalls of the slot 51, so that the whole supporting device 6 could be pivotally turned about the shafts 61 and lifted from the slot 51. A lower end of the supporting device 6 is inward bent to form a bottom plate 62, on which a locking means 63 is provided corresponding to the retaining means 52 at the bottom section of the slot 51. In the illustrated embodiment, the retaining means 52 is a dent and the locking means 63 is a corresponding dot.

The supporting device 6 could be moved from the slot 51 to an extended position for stably supporting the main body 5 simply by pulling the supporting device 6 to disengage the locking means 63 on the bottom plate 62 from the retaining means 52 on the bottom section of the slot 51, so that the whole supporting device 6 is pivotally turned about the shafts 61 relative to the sidewalls of the slot 51 to move out of the main body 5. When the supporting devices 6 are fully pivotally pulled out of the main body 5 as shown in FIG. 2, they are located at front and rear sides of the main body 5 with a predetermined angle contained between them and the main body 5, allowing the main body 5 of the internal/external enclosure to stably stand on a desired place through supporting of the bottom plates 62 of the extended supporting devices 6. When the internal/external enclosure is not in use and it is desired to carry the internal/external enclosure for use at some other place, the extended supporting devices 6 could be moved into a folded position simply by separately pushing the supporting devices 6 back into the slots 51 until the locking means 63 on the bottom plates 62 are engaged with the retaining means 52 on the bottom sections of the slots 51.

Figure 4:
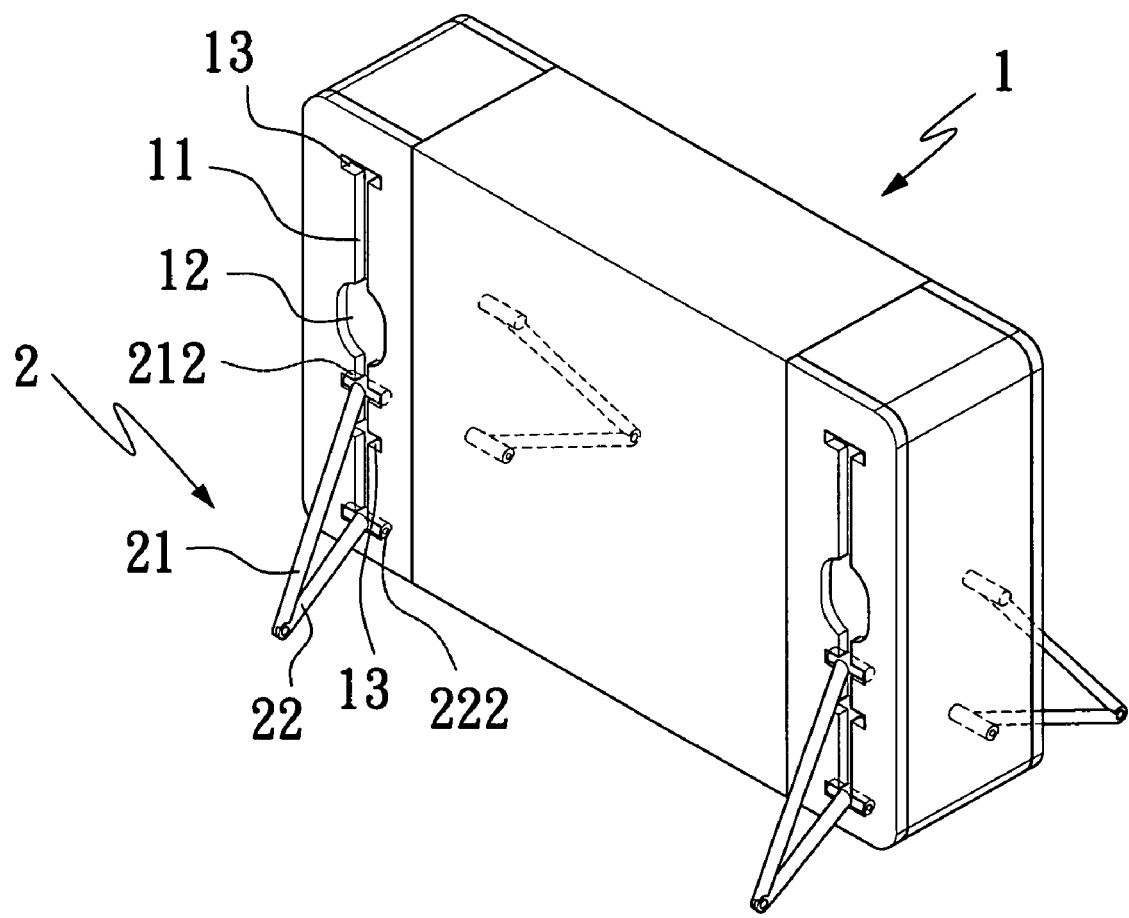
FIG. 4 is an assembled perspective view of an internal/external enclosure for computer removable storage medium according to a second embodiment of the present invention.
Figure 5:
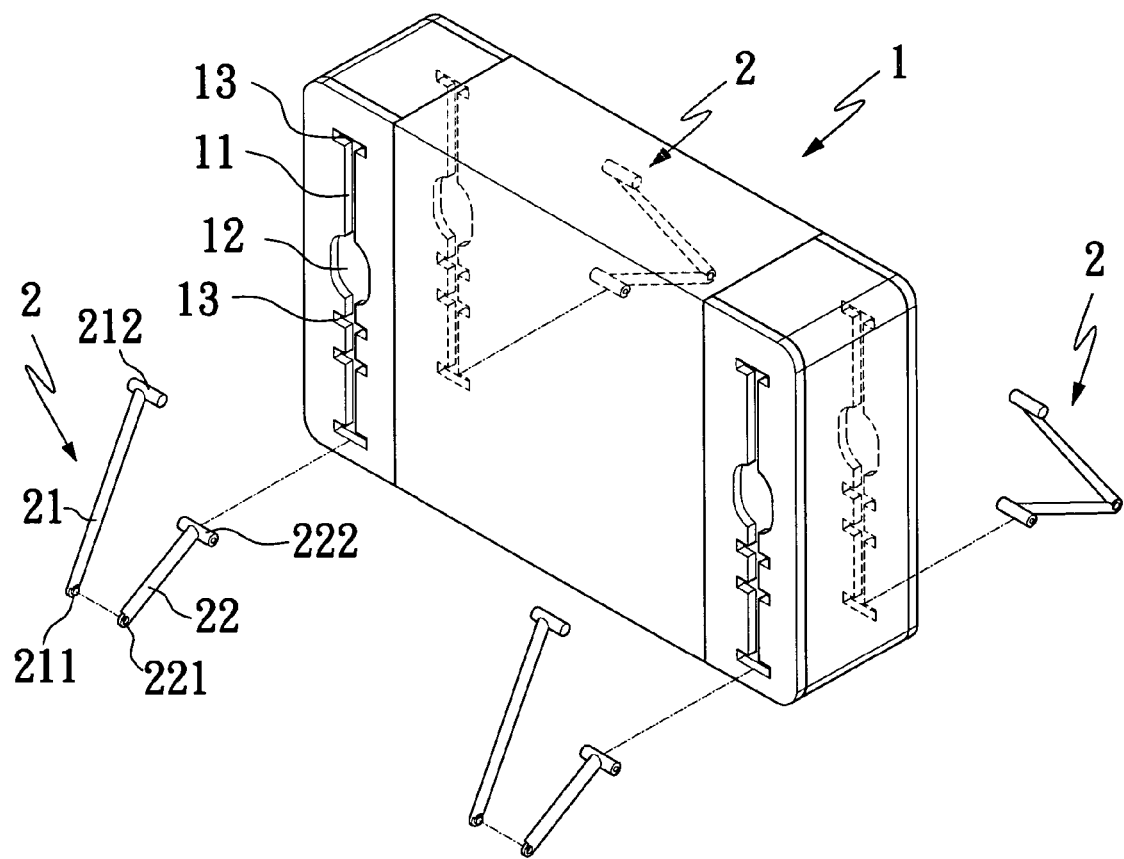
FIG. 5 is an exploded perspective view of the internal/external enclosure of FIG. 4.

FIGS. 4 and 5 are assembled and exploded perspective views, respectively, of an internal/external enclosure for computer removable storage medium according to a second embodiment of the present invention. As shown, the internal/external enclosure of the second embodiment includes a main body 1, which is provided on front and rear sides near two lateral ends with an elongated slot 11 each. Each of the elongated slots 11 is formed near a middle point with an expanded opening 12, and at other predetermined points with more than one sideward widened locating holes 13. A supporting device 2 is operatively mounted in each elongated slot 11. The supporting device 2 includes a first supporting member 21 and a second supporting member 22 having two opposite ends each. The first and the second supporting member 21, 22 are pivotally turnably connected to each other at respective first ends by rotatably engaging a shaft 211 provided at the first end of the first supporting member 21 with a through hole 221 provided at the first end the second supporting member 22, and are provided at respective second ends with a stopper 212, 222 each. The stoppers 212, 222 have a configuration corresponding to that of the locating holes 13 on the elongated slots 11 but are slightly larger than the locating holes 13 in size.

Figure 6:
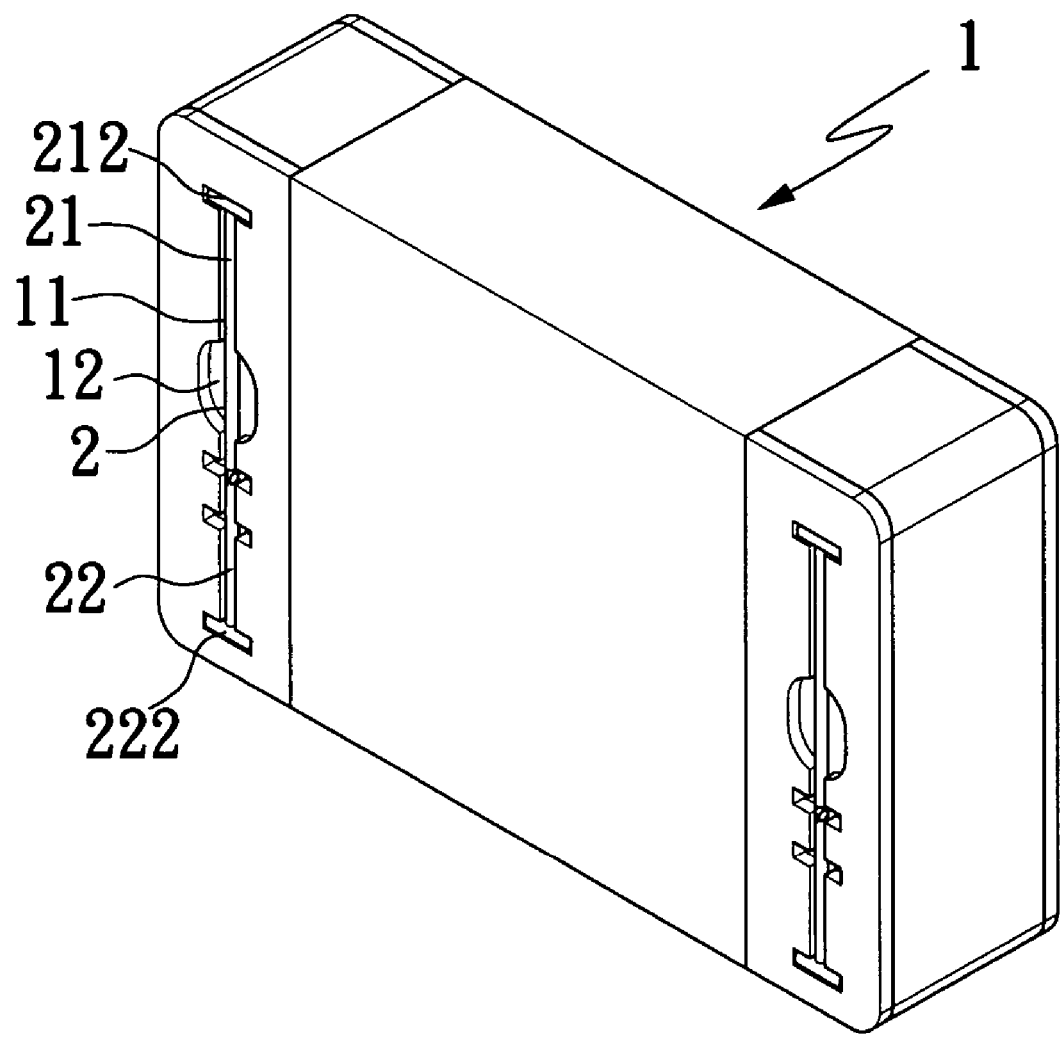
FIG. 6 is an assembled perspective view of the internal/external enclosure of FIG. 4 with supporting devices thereof in a folded position.
Figure 7:
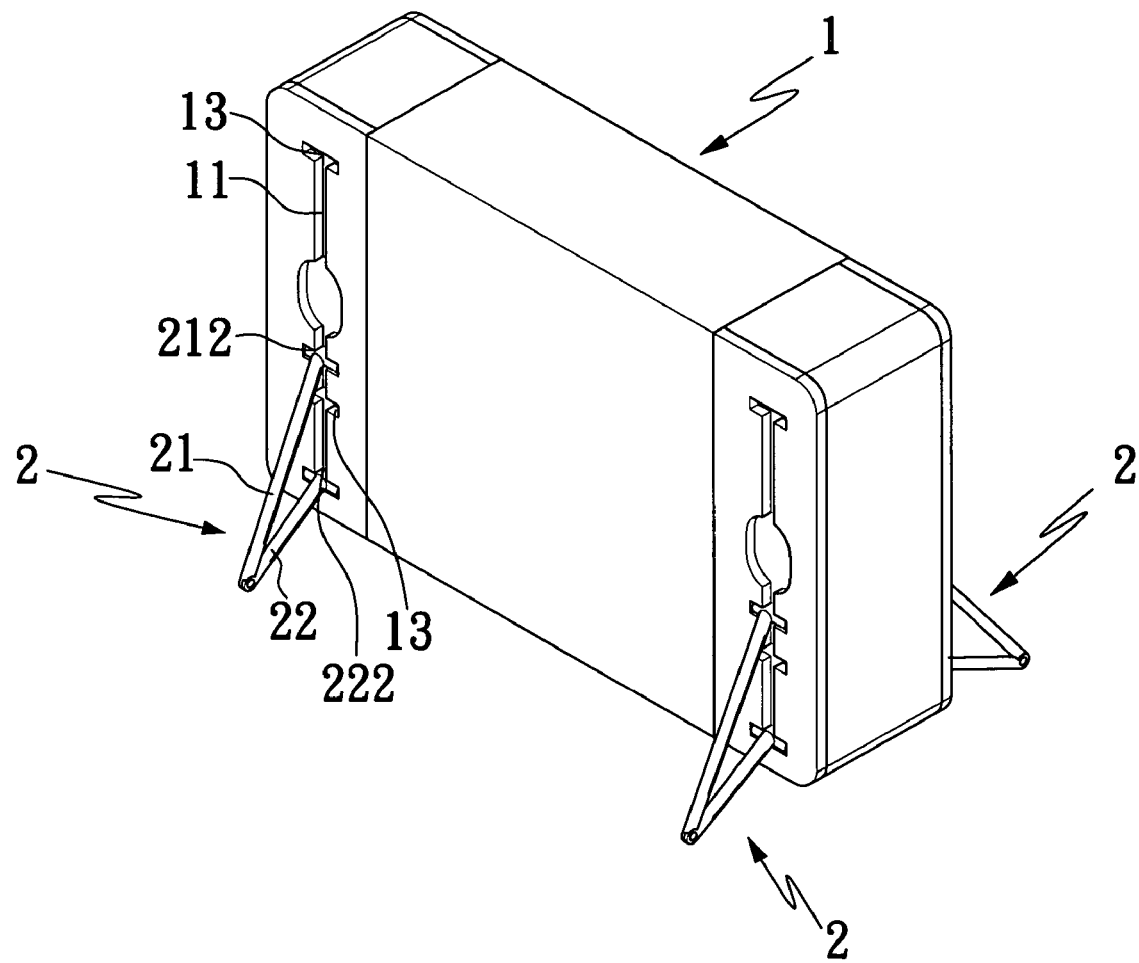
FIG. 7 is an assembled perspective view of the internal/external enclosure of FIG. 4 with supporting devices thereof in an extended position.

Please also refer to FIGS. 6 and 7 that are perspective views of the internal/external enclosure of the second embodiment with the supporting devices 2 received in and extended from the elongated slots 11 of the main body 1, respectively. When it is desired to use the internal/external enclosure, a user may first pull the first supporting member 21 of a first one of the supporting devices 2 out of the elongated slot 11 via the expanded opening 12 near the middle point thereof. In the process of pulling the first supporting member 21 out of the elongated slot 11, the stopper 222 at the second end of the second supporting member 22, the first end of which is pivotally connected to the first supporting member 21, is abutted on an inner side of a lowest one of the locating holes 13 to turn axially without linearly moving along the elongated slot 11. Meanwhile, the first supporting member 21 is kept moving along the elongated slot 11 toward the second supporting member 22 to finally abut the stopper 212 on an inner side of a desired one of the locating holes 13, such that a suitable angle is contained between the pivotally connected first and second supporting members 21, 22. The angle contained between the first and the second supporting members 21, 22 determines a height at which the main body 1 of the internal/external enclosure is supported on a desired place. When the internal/external enclosure is not in use and it is desired to carry the same for use at some other place, the supporting devices 2 maybe received in the elongated slots 11 again simply by pushing the first supporting members 21 back into the elongated slots 11.

Figure 8:
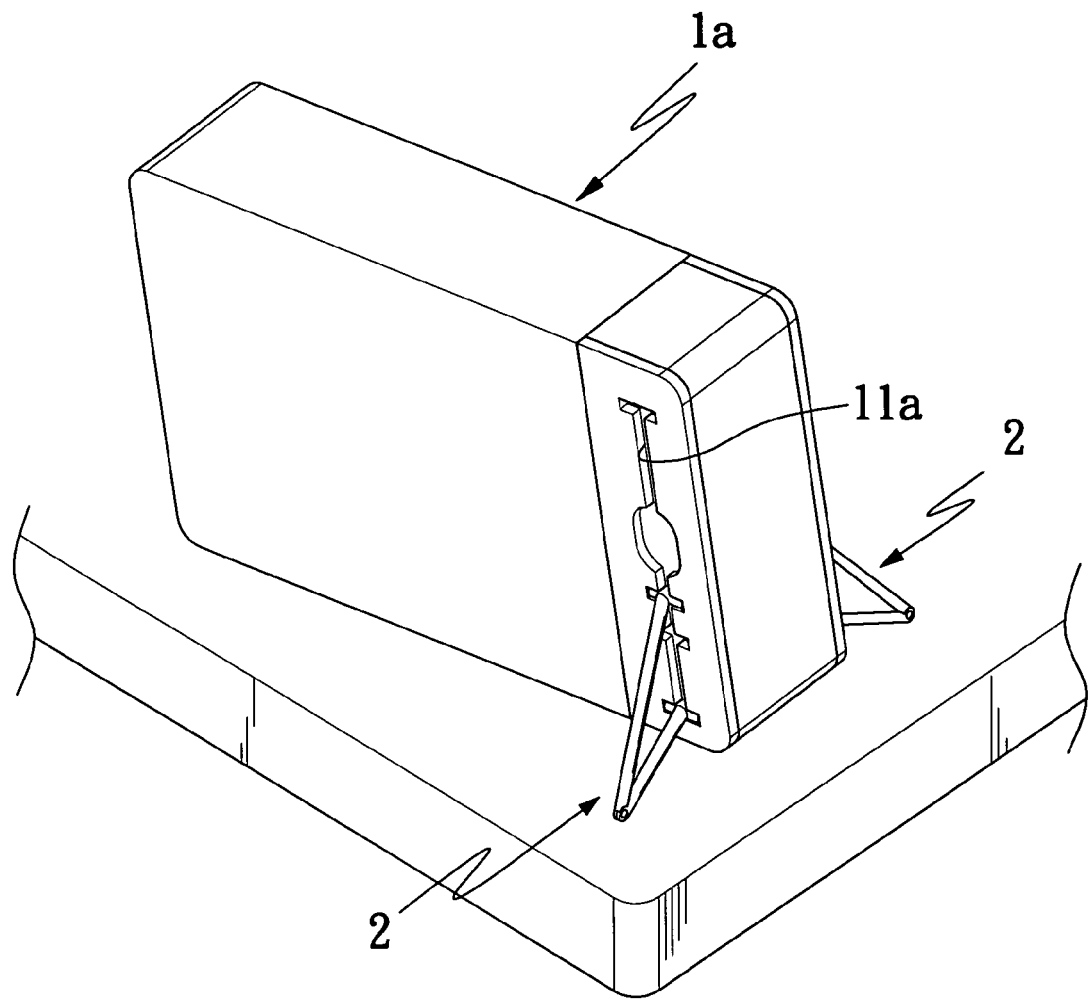
FIG. 8 is an assembled perspective view of an internal/external enclosure for computer removable storage medium according to a third embodiment of the present invention.

FIG. 8 shows an internal/external enclosure for computer removable storage medium according to a third embodiment of the present invention. As shown, the internal/external enclosure of the third embodiment includes a main body 1*a*, which is provided on front and rear sides near one of two lateral ends with an elongated slot 11*a* each. And, a supporting device 2 is operatively mounted in each of the elongated slots 11*a*.

Figure 9:
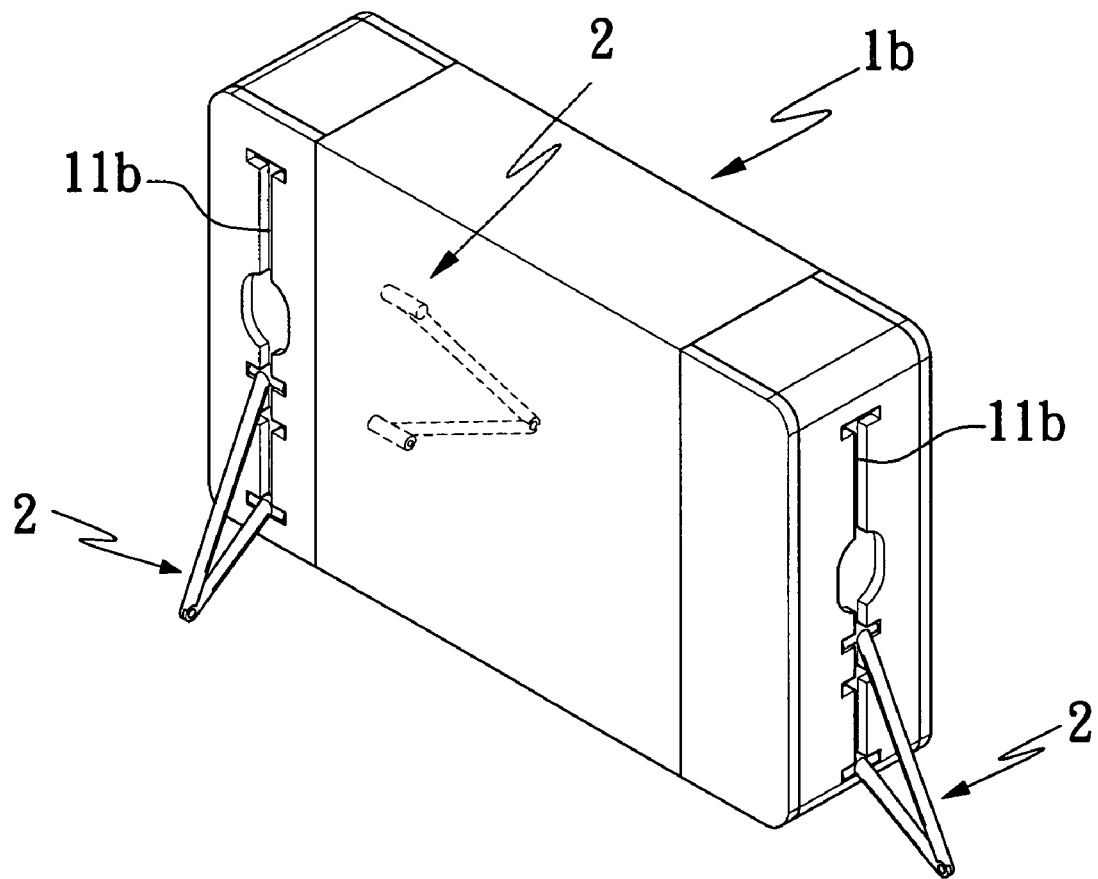
FIG. 9 is an assembled perspective view of an internal/external enclosure for computer removable storage medium according to a fourth embodiment of the present invention.

FIG. 9 shows an internal/external enclosure for computer removable storage medium according to a fourth embodiment of the present invention. As shown, the internal/external enclosure of the fourth embodiment includes a main body 1*b*, which is provided on front and rear sides at one of two lateral ends thereof and on one of two end surfaces thereof with an elongated slot 11*b* each, depending on an actual condition of use of the internal/external enclosure. And, a supporting device 2 is operatively mounted in each of the elongated slots 11*b*.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An internal/external enclosure for a computer removable storage medium, comprising:
   a main body, which is provided on front and rear sides near at least one lateral end each with a slot; and
   more than one supporting device being operatively mounted in said slots,
   wherein said more than one supporting device is provided at two lateral sides of an upper end each with a shaft for rotatably connecting to two sidewalls of said slot, so that said supporting device is pivotally turnable about said shafts and lifted from said slot; and said supporting device being inward bent at a lower end to form a bottom plate, on which a locking means is provided.

2. The internal/external enclosure for computer removable storage medium as claimed in claim 1, wherein each of said slots provided on said main body is formed near a middle point with an expanded opening, through which said supporting device is pullable outward, and at other predetermined points with more than one sideward widened locating holes, on an inner side of which two ends of said supporting device are abutted.

3. An internal/external enclosure for computer removable storage medium, comprising:
   a main body, which is provided on front and rear sides near at least one lateral end each with a slot; and
   more than one supporting device being operatively mounted in said slots,
   wherein said more than one supporting device includes a first supporting member and a second supporting member each having two opposite ends, and said first and second supporting members being pivotally turnably connected to each other at respective first ends and provided at respective second ends each with a stopper; and
   wherein said first and said second supporting member are pivotally turnably connected to each other at respective first ends via a shaft provided at the first end of said first supporting member.

4. The internal/external enclosure for computer removable storage medium as claimed in claim 3, wherein said first and said second supporting member are pivotally turnably connected to each other at respective first ends via a through hole provided at the first end of said second supporting member.

5. An internal/external enclosure for computer removable storage medium, comprising:

a main body, which is provided on front and rear sides near at least one lateral end each with a slot; and more than one supporting device being operatively mounted in said slots, wherein said more than one supporting device includes a first supporting member and a second supporting member each having two opposite ends, and said first and second supporting members being pivotally turnably connected to each other at respective first ends and provided at respective second ends each with a stopper; and wherein said stoppers are slightly larger than said locating holes in size.

* * * * *